US012377767B2

(12) United States Patent
Seo et al.

(10) Patent No.: US 12,377,767 B2
(45) Date of Patent: Aug. 5, 2025

(54) VEHICLE SEAT

(71) Applicants: Hyundai Motor Company, Seoul (KR); Kia Corporation, Seoul (KR); Daechang Seat Co., LTD-Dongtan, Hwaseong-si (KR)

(72) Inventors: Sang Man Seo, Suwon-si (KR); Suk Won Hong, Bucheon-si (KR); Jae Hwa Lee, Daegu (KR); Chan Ki Cho, Pyeongchang-gun (KR); Myung Soo Lee, Osan-si (KR)

(73) Assignees: Hyundai Motor Company, Seoul (KR); Kia Corporation, Seoul (KR); Daechang Seat Co., LTD-Dongtan, Hwaseong-si (KR)

( * ) Notice: Subject to any disclaimer, the term of this patent is extended or adjusted under 35 U.S.C. 154(b) by 245 days.

(21) Appl. No.: 18/320,693

(22) Filed: May 19, 2023

(65) Prior Publication Data
US 2024/0174151 A1 May 30, 2024

(30) Foreign Application Priority Data
Nov. 30, 2022 (KR) .................. 10-2022-0163893

(51) Int. Cl.
*B60N 2/20* (2006.01)
*B60N 2/862* (2018.01)
*A47C 7/40* (2006.01)
*B60N 2/22* (2006.01)

(52) U.S. Cl.
CPC ............... *B60N 2/862* (2018.02); *B60N 2/20* (2013.01); *A47C 7/405* (2013.01); *B60N 2/2222* (2013.01)

(58) Field of Classification Search
CPC ........ B60N 2/862; B60N 2/22; B60N 2/2222; A47C 7/405
See application file for complete search history.

(56) References Cited

U.S. PATENT DOCUMENTS

| 6,464,297 | B2 * | 10/2002 | Garrido | B60N 2/206 297/354.11 |
|---|---|---|---|---|
| 6,739,668 | B2 * | 5/2004 | Coman | B60N 2/2222 297/378.12 |
| 7,845,729 | B2 * | 12/2010 | Yamada | B60N 2/02246 297/354.11 |
| 8,262,164 | B2 * | 9/2012 | Ito | B60N 2/933 297/354.11 |
| 9,340,127 | B2 * | 5/2016 | Kroencke | B60N 2/224 |
| 9,415,713 | B2 * | 8/2016 | Line | B60N 2/02246 |
| 9,796,302 | B2 * | 10/2017 | Nishide | B60N 2/2222 |

(Continued)

*Primary Examiner* — Syed A Islam
(74) *Attorney, Agent, or Firm* — Slater Matsil, LLP

(57) ABSTRACT

An embodiment vehicle seat includes a seatback configured to support an occupant's upper body, the seatback including an upper seatback part and a lower seatback part, wherein the upper seatback part includes a tilting part pivotably hinged onto the lower seatback part so as to be tiltable forward and backward with respect to the lower seatback part as the upper seatback part is pivoted forward and backward about the lower seatback part, and a tilting device configured to tilt the tilting part forward and backward in conjunction with a reclining operation of the seatback, wherein the tilting device is configured to tilt the tilting part forward in conjunction with a backward reclining operation of the seatback.

20 Claims, 10 Drawing Sheets

(56) References Cited

U.S. PATENT DOCUMENTS

| | | | | |
|---|---|---|---|---|
| 10,059,233 B2* | 8/2018 | Suzuki | ............... | B60N 2/02246 |
| 10,457,167 B2* | 10/2019 | Mochizuki | ............. | B60N 2/682 |
| 10,632,866 B2* | 4/2020 | Benson | ................ | B60N 2/0248 |
| 10,973,333 B2* | 4/2021 | Seibold | .................. | A47C 7/462 |
| 2018/0264976 A1* | 9/2018 | Novitsky | ............. | B60N 2/2231 |
| 2024/0149755 A1* | 5/2024 | Susko | .................... | B60N 2/986 |
| 2024/0253536 A1* | 8/2024 | Lan | .................... | B60N 2/02253 |

* cited by examiner

VEHICLE SEAT

CROSS-REFERENCE TO RELATED APPLICATIONS

This application claims the benefit of Korean Patent Application No. 10-2022-0163893, filed on Nov. 30, 2022, which application is hereby incorporated herein by reference.

TECHNICAL FIELD

The present invention relates to a vehicle seat.

BACKGROUND

In a state in which an occupant is seated on a seat during driving of a vehicle, the occupant needs to maintain his/her upper and lower body in a substantially fixed position, which inevitably increases fatigue in the muscles of the occupant's upper and lower body. Accordingly, during long-time driving, occupants seek a more comfortable position.

In a vehicle seat, a seatback plays a role of supporting an occupant's back comfortably, and a recliner for adjusting an angle of the seatback is usually applied to the vehicle seat as a device for changing an occupant's seated posture.

When the recliner is applied, the seatback may be pivoted about a connection point with a seat cushion so that the angle of the seatback is adjusted at various angles, enabling the occupant to be comfortably seated on the seat in his/her desired posture.

However, although as the angle of the seatback may be adjusted at various angles, enabling the occupant to use the seat in a more comfortable position, there is a problem in that if the occupant uses the vehicle seat while reclining the seatback a lot, the distance between the seatback and the occupant's upper body increases, causing a problem in that the support for the occupant's upper body is greatly reduced.

FIGS. 1A and 1B (collectively FIG. 1) provide a diagram illustrating a problem of a conventional vehicle seat in a state in which the occupant's upper body moves away from a seatback 1 that is in a reclining state in which the seatback 1 is tilted backward. FIG. 1A shows a normal position, whereas FIG. 1B shows the seatback's reclining state in which the seatback 1 is reclined back.

In contrast to the normal position shown in FIG. 1A, in case of a reclined position in which the seatback 1 is reclined a lot backward as shown in FIG. 1B, as the occupant's upper body, such as the head, moves away from the seatback 1, a problem of poor support occurs.

In particular, when the occupant looks forward, even if the seatback 1 moves backward, the upper body of the occupant who looks forward does not move backward to that extent, so the occupant's upper body such as the head does not rest on the seatback 1, but is separated away from the seatback 1, which makes the occupant feel uncomfortable.

SUMMARY

The present invention relates to a vehicle seat. Particular embodiments relate to a vehicle seat configured to enable partial tilting of a seatback in conjunction with reclining of the seatback.

Embodiments of the present invention address problems associated with the related art, and a particular embodiment of the present invention provides a vehicle seat in which even if a seatback is reclined back a lot with a reclining operation, the seatback's support for the occupant's upper body is supplemented so that the occupant's upper body can be stably supported, thereby providing comfortable support for occupants.

The embodiments of the present invention are not limited to the aforementioned embodiments, and the other embodiments not mentioned may be clearly understood by those with ordinary skill in the art to which the present invention pertains (hereinafter "those skilled in the art") from the following description.

According to an embodiment of the present invention, there is provided a vehicle seat including a seatback supporting the occupant's upper body and having an upper seatback part and a lower seatback part, the upper seatback part being configured as a tilting part pivotably hinged onto the lower seatback part so as to be tilted forward and backward with respect to the lower seatback part as the upper seatback part is pivoted forward and backward about the lower seatback part, and a tilting device configured to tilt the tilting part forward and backward in conjunction with a reclining operation of the seatback, wherein the tilting device is configured to tilt the tilting part forward in conjunction with a backward reclining operation of the seatback.

As described above, according to the vehicle seat of embodiments of the present invention, the tilting part, which is the upper part of the seatback, is tilted forward in conjunction with the backward reclining operation of the seatback, so that the occupant's upper body can be stably supported even when the seatback is reclined a lot. In particular, the seatback's support for the occupant's upper body can be supplemented, and the seatback's comfortable and uniform support performance can be provided.

In addition, the vehicle seat according to embodiments of the present invention has advantages in terms of cost and weight by employing a simple cable-actuated mechanism configuration instead of a motorized device configuration using a motor or the like. Furthermore, the vehicle seat according to embodiments of the present invention has advantages in terms of usability and convenience, since the forward tilting operation of the upper part of the seatback is automatically performed in conjunction with the backward reclining of the seatback without a separate operation.

BRIEF DESCRIPTION OF THE DRAWINGS

FIG. 2, which includes

DETAILED DESCRIPTION OF ILLUSTRATIVE EMBODIMENTS

Figure 1A:
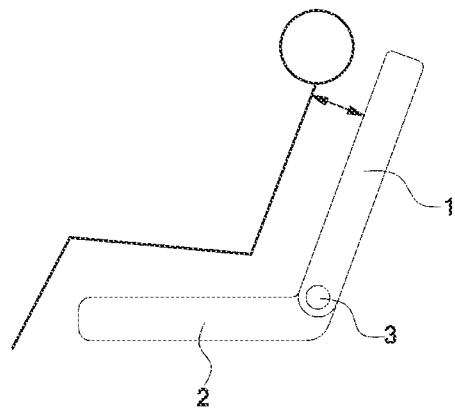
FIG. 1, which includes FIGS. 1A and B, is a diagram illustrating a conventional vehicle seat showing the state in which the occupant's upper body moves away from a seatback in a reclining state in which the seatback is tilted backward.
Figure 1B:
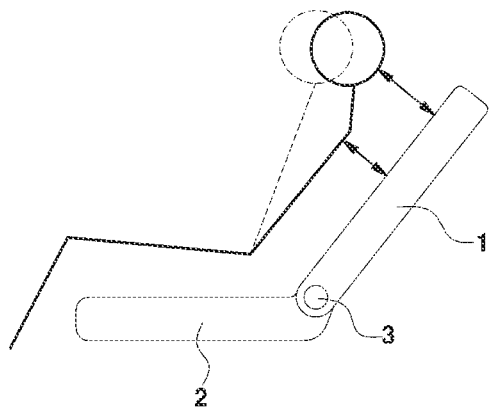

Hereinafter, exemplary embodiments of the present invention will be described in detail with reference to the accompanying drawings. Specific structural or functional descriptions presented in exemplary embodiments of the present invention are only exemplified for the purpose of describing the exemplary embodiments according to the concept of the present invention, and the exemplary embodiments according to the concept of the present invention may be carried out in various forms. Further, the exemplary embodiments should not be interpreted as being limited to the exemplary embodiments described in the present specification and should be understood as including all modifications, equivalents, and substitutes included in the spirit and scope of the present invention.

Meanwhile, in describing embodiments of the present invention, terms such as first and/or second may be used to describe various components, but the components are not limited by the terms. The terms are used only for the purpose of distinguishing one component from other components. For example, a first component may be referred to as a second component, and similarly, the second component may also be referred to as the first component, without departing from the scope according to the concept of the present invention.

When a component is referred to as being "connected" or "coupled" to another component, it should be understood that the components may be directly connected or coupled to each other, but still other components may also exist therebetween. On the other hand, when a component is referred to as being "directly connected to" or "in direct contact with" another component, it should be understood that there is no other component therebetween. Other expressions for describing the relationship between components, that is, expressions such as "between" and "directly between" or "adjacent to" and "directly adjacent to" also should be interpreted in the same manner.

Throughout the specification, the same reference numerals refer to the same elements. Meanwhile, the terms used in the present specification are for the purpose of describing the exemplary embodiments and are not intended to limit the present invention. In the present specification, the singular form also includes the plural form unless otherwise specified in the phrase. "Comprises" and/or "comprising" used in the specification specifies the presence of the mentioned component, step, operation, and/or element, and does not exclude the presence or the addition of one or more other components, steps, operations, and/or elements.

Figure 2A:
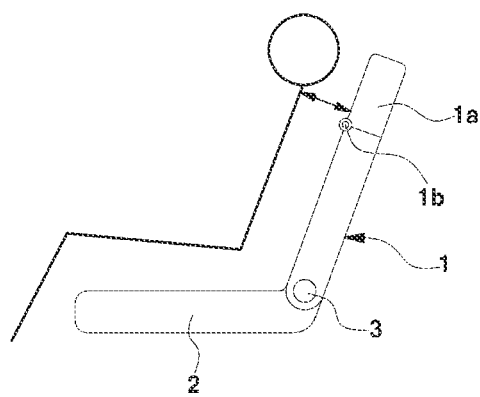
FIGS. 2A and 2B, is a diagram illustrating a partially tilted state of a seatback in a vehicle seat according to an embodiment of the present invention.
Figure 2B:
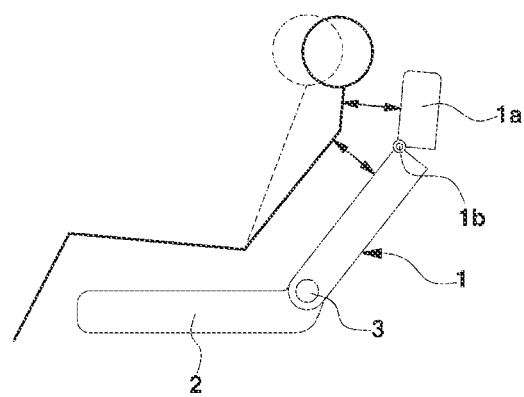

FIGS. 2A and 2B illustrate a partially tilted state of a seatback 1 in a vehicle seat according to an embodiment of the present invention. In the following description, the seatback 1, a seat cushion 2, and a tilting part 1a where tilting is performed in the seatback 1 will be described with reference to FIGS. 2A and 2B. As illustrated in FIGS. 2A and 2B, the tilting part 1a, which is the upper part of the seatback 1, has a structure capable of tilting around a hinged joint 1b with a lower part of the seatback.

Figure 3:
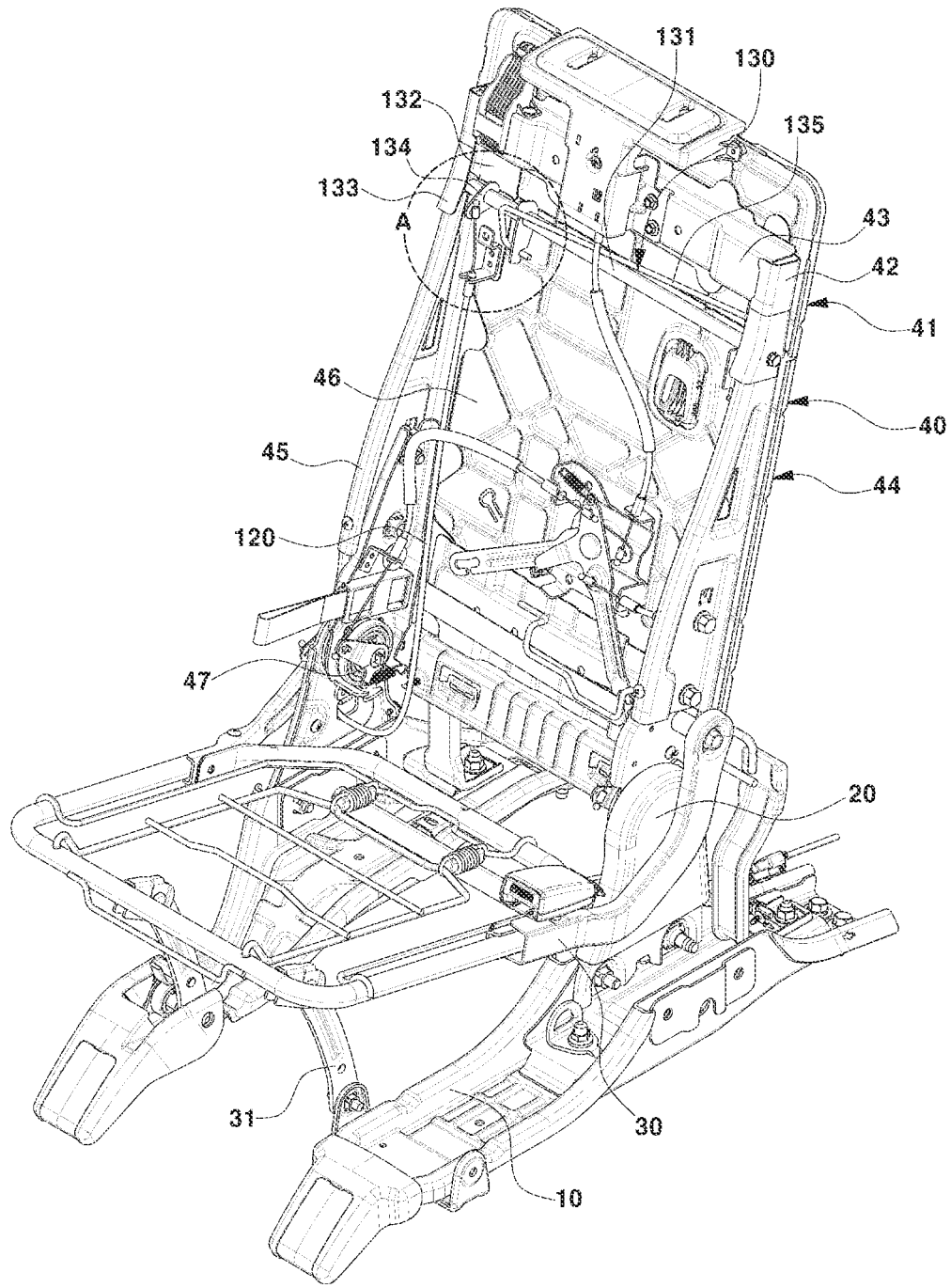
FIG. 3 is a perspective view illustrating the state in which a tilting device is installed on a back frame in the vehicle seat according to an embodiment of the present invention.
Figure 4:
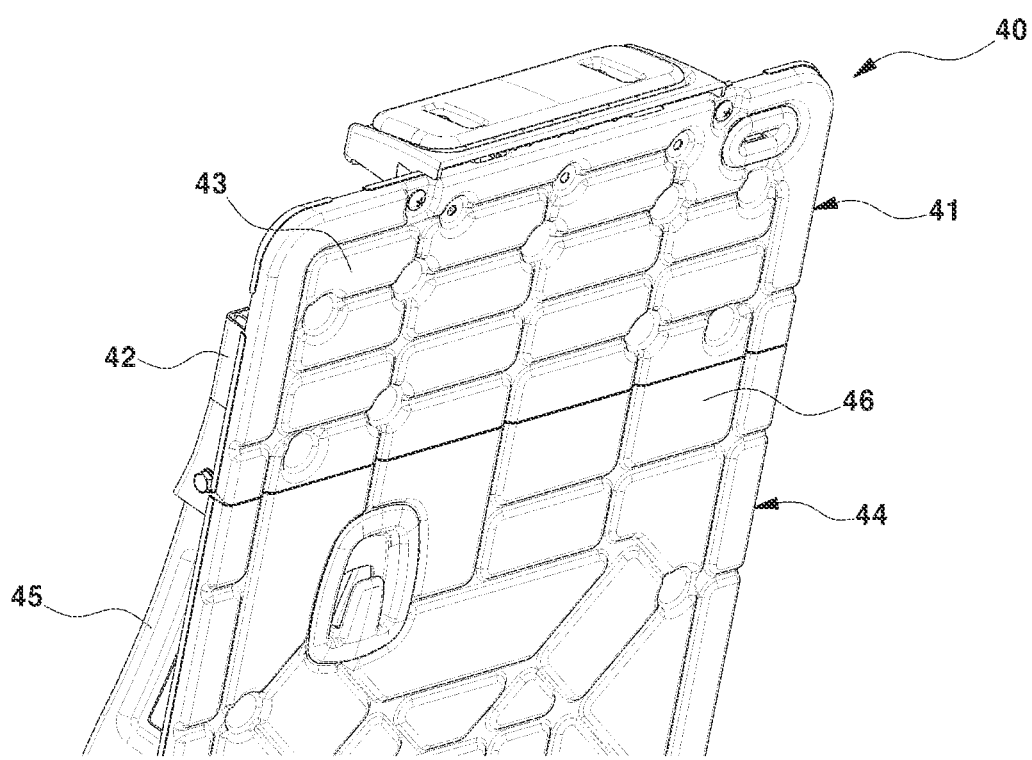
FIG. 4 is a perspective view illustrating the state in which upper and lower parts of the back frame are separated in the vehicle seat according to an embodiment of the present invention.

FIG. 3 is a perspective view illustrating the state in which a tilting device is installed on a back frame 40 in the vehicle seat according to an embodiment of the present invention, and FIG. 4 is a perspective view illustrating the state in which upper and lower parts of the back frame 40 are separated in the vehicle seat according to an embodiment of the present invention.

As illustrated, base brackets 20 are respectively installed on base frames 10 disposed on both left and right sides at a lower end of a seat, and a lower end of a back frame 40 is pivotably hinged onto the base brackets 20 on both left and right sides.

In addition, a front end of a cushion frame 30 of the seat cushion 2 is connected to and supported by the base frames 10 via a link 31 while a rear end of the cushion frame is pivotably hinged onto the back frame 40.

Like a conventional seatback configuration, the seatback 1 of the vehicle seat according to an embodiment of the present invention includes the back frame 40 that maintains the shape of the seatback while forming the skeleton thereof, a form pad (not shown) that is installed to surround the back frame and accessory devices, and a skin material (not shown) that covers the form pad.

Here, the accessory devices include various devices for supporting a load, moving the seat forward and backward, adjusting an angle of the seatback 1, adjusting a height of a headrest (not shown), or the like. In FIGS. 2A and 2B, the part forming the exterior and surface of the seatback 1 may be referred to as the skin material, and the part located inside the skin material to form the overall shape of the seatback may be referred to as the form pad.

The back frame 40 includes side frames 42 and 45 disposed to extend vertically on both left and right sides and a load support member in the form of a plate 43 or 46 or spring installed between the side frames on both left and right sides.

In the embodiment of FIG. 3, as the load support member, the plates 43 and 46 are integrally coupled between the left and right side frames 42 and 45 of the back frame 40 so as to be positioned at the rear portion of the seatback 1.

In the seatback 1 of the vehicle seat according to an embodiment of the present invention, the back frame 40 has a configuration in which individual upper and lower portions are assembled together to form the back frame 40.

At this time, the side frames and the plates also have a similar configuration such that each of the side frames includes individual upper and lower portions, and the plates include individual upper and lower plates 43 and 46.

The upper side frames 42 and the lower side frames 45 are hinged-coupled together via an actuating shaft 131 described later, the upper plate 43 has both left and right side ends integrally coupled to the upper side frames 42, and the lower plate 46 has both left and right side ends integrally coupled to the lower side frames 45.

As a result, the upper part of the back frame 40 has a configuration in which the upper side frames 42 and the upper plate 43 are coupled, and the lower part of the back frame 40 has a configuration in which the lower side frames 45 and the lower plate 46 are coupled.

In the following description, the upper and lower parts of the back frame 40 provided in the separated configuration as described above will be referred to as 'upper frame 41' and 'lower frame 44', respectively. That is, the upper frame 41 has a configuration in which the upper side frames 42 and the upper plate 43 are coupled, and the lower frame 44 has a configuration in which the lower side frames 45 and the lower plate 46 are coupled.

In the lower frame 44, lower ends of the lower side frames 45 are pivotably hinged onto the base brackets 20. Accordingly, as the back frame 40 is pivoted around a hinge joint with the base brackets 20, front and rear reclining and angle adjustment, folding, and unfolding operations of the seatback 1 can be performed. Here, the hinge joint is a part including a hinge shaft (reference numeral '47' in FIG. 7) to be described later.

Although not shown in detail in FIGS. 2 and 3, a recliner 3 is provided at the hinge joint, which is the center of pivot of the seatback 1, so that the seatback 1 can be reclined while pivoting around the hinge joint by the recliner 3. This reclining operation allows the angle of the seatback 1 to be adjusted.

In addition, the upper frame 41 is hinged-coupled to the lower frame 44 such that the lower end of the upper frame 41 is pivotably hinged onto the upper end of the lower frame 44. Here, specifically, the upper end of the lower side frame 45 may be hinged onto the lower end of the upper side frame 42.

Accordingly, it is possible for the upper frame 41 to be tilted forward and backward as the upper frame is pivoted around a hinge joint (reference numeral '1b' in FIGS. 2A and 2B), which is a connection with the lower frame 44. Here, the hinge joint 1b is a portion including an actuating shaft (reference numeral '131' in FIG. 9) to be described later.

In this way, when the upper frame 41 is tilted forward and backward, the form pad and the skin material surrounding the upper frame 41 are also moved forward and backward by the tilting action of the upper frame 41, so that the entire upper part of the seatback 1 is tilted forward and backward.

As can be seen in FIG. 4, in the back frame 40, the side frames are separated into the upper side frames 42 and the lower side frames 45, and the plates include the upper plate 43 and the lower plate 46 which are separated from each other.

In this separated configuration, as described above, the upper side frames 42 and the upper plate 43 which are integrally coupled together constitute the upper frame 41, and the lower side frames 45 and the lower plate 46 which are integrally coupled together constitute the lower frame 44.

On the other hand, the vehicle seat according to an embodiment of the present invention is configured such that the seatback is partially tilted during the reclining operation of the seatback 1. Here, the 'partial tilting' of the seatback 1 means an operation in which the upper part of the seatback 1 is pivoted around the hinge joint 1b with respect to the remaining lower part of the seatback and is tilted forward and backward.

In the following description, since the 'upper part' of the seatback 1 is tilted forward and backward, the 'upper part' will be referred to as a 'tilting part 1a'. In embodiments of the present invention, the tilting part 1a of the seatback 1 is a part of the seatback 1, particularly the upper part of the seatback 1, and includes the upper frame 41 and the form pad and skin material surrounding the upper part. A headrest (not shown) may be mounted on the tilting part 1a.

In addition, the vehicle seat according to an embodiment of the present invention includes a tilting device 100 that tilts the tilting part 1a forward and backward in conjunction with the reclining operation of the seatback 1 (the operation for adjusting an angle of the seatback).

Figure 5:
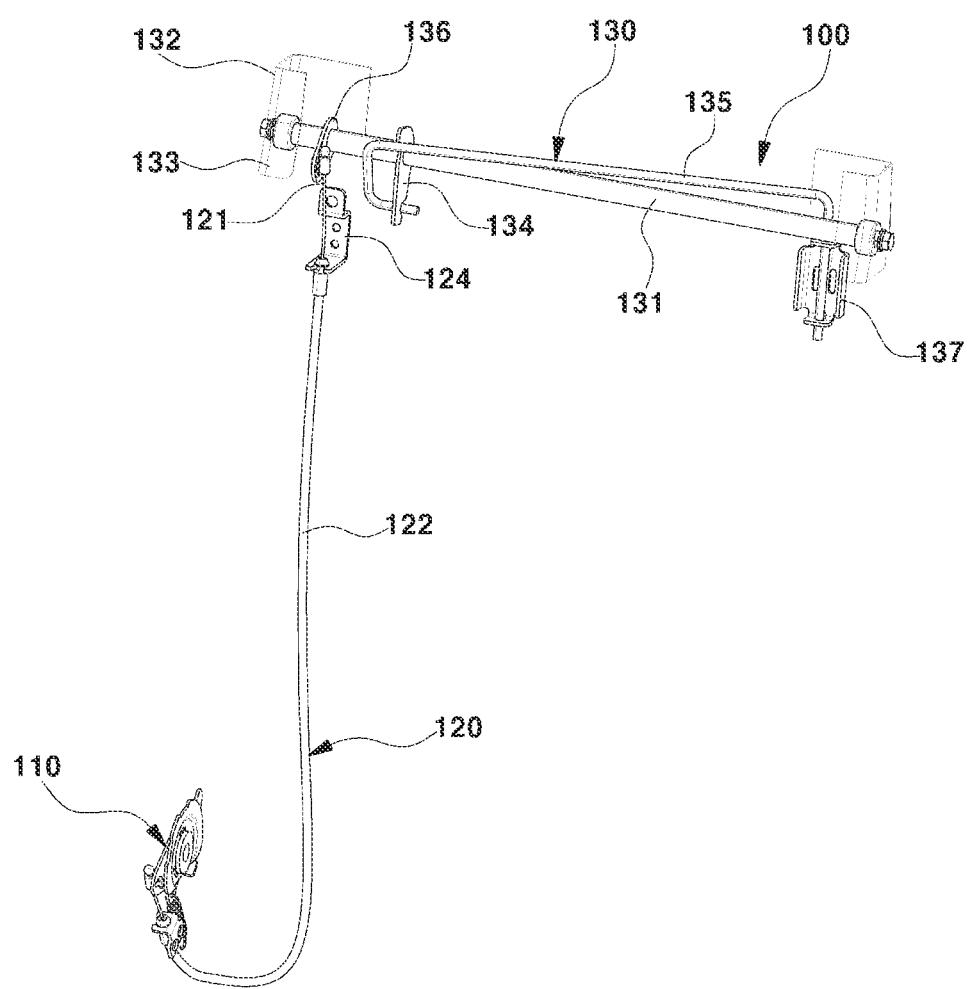
FIG. 5 is a perspective view illustrating the tilting device in the vehicle seat according to an embodiment of the present invention.
Figure 6:
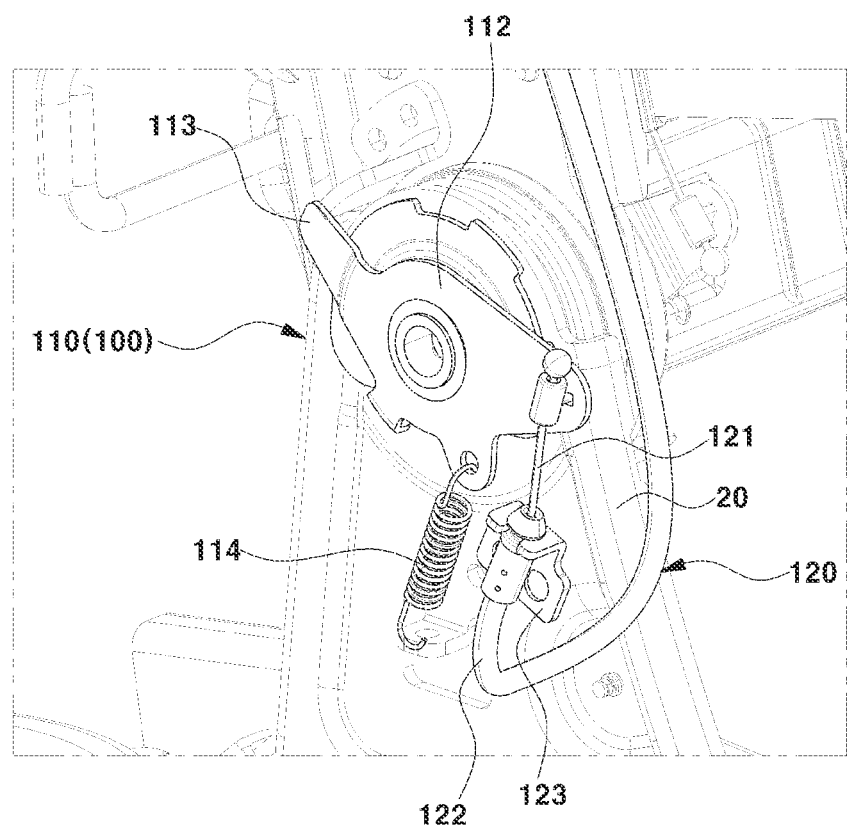
FIG. 6 is a perspective view illustrating an interworking mechanism of the tilting device in the vehicle seat according to an embodiment of the present invention.

FIG. 5 is a perspective view illustrating the tilting device in the vehicle seat according to an embodiment of the present invention, and FIG. 6 is a perspective view illustrating an interworking mechanism of the tilting device in the vehicle seat according to an embodiment of the present invention.

In the vehicle seat according to an embodiment of the present invention, when the seatback 1 is reclined backward, the tilting part 1a, which is the upper part of the seatback 1, is automatically tilted forward by the tilting device 100 (see the 'backward position' in FIG. 2B).

In addition, when the seatback 1 is reclined forward, the tilting part 1a is automatically tilted backward to its original position (see the 'normal position' in FIG. 2A) by the tilting device 100.

As a result, even if the seatback 1 is reclined backward a lot, the tilting part 1a is tilted forward and comes close to the occupant's upper body such as the occupant's head, thereby improving the support performance for the occupant's upper body.

When the seatback 1 is reclined backward by the recliner 3, the tilting part 1a, which is the upper part of the seatback 1, is tilted forward, resulting in the forward movement of the upper part of the seatback 1 supporting the occupant's upper body such as the occupant's shoulders and head even upon the substantial backward reclining of the lower part of the seatback 1 supporting the occupant's back, thereby stably supporting the occupant's upper body with the seatback 1.

In an embodiment of the present invention, the tilting device 100 includes a cable 121 that automatically tilts the tilting part 1a, which is the upper part of the seatback 1, forward in conjunction with the backward reclining (pivoting) of the seatback 1.

In an embodiment of the present invention, when the seatback 1 is reclined backward, the tilting part 1a is tilted forward in conjunction with the cable 121, but when the seatback 1 is reclined forward, the tilting part 1a is automatically tilted backward by the elastic restoring force of a return spring 114 and an elastic member (referred to as '135' in FIG. 9) to be described later.

First, the tilting device 100 includes a reclining interworking drive mechanism 110 that provides an actuating force for forward tilting of the tilting part 1a in conjunction with the backward reclining of the seatback 1, a cable 121 that transfers the actuating force provided by the reclining interworking drive mechanism 110, and a pivot mechanism 130 that pivots the upper frame 41 so that the tilting part 1a is tilted forward.

Figure 7:
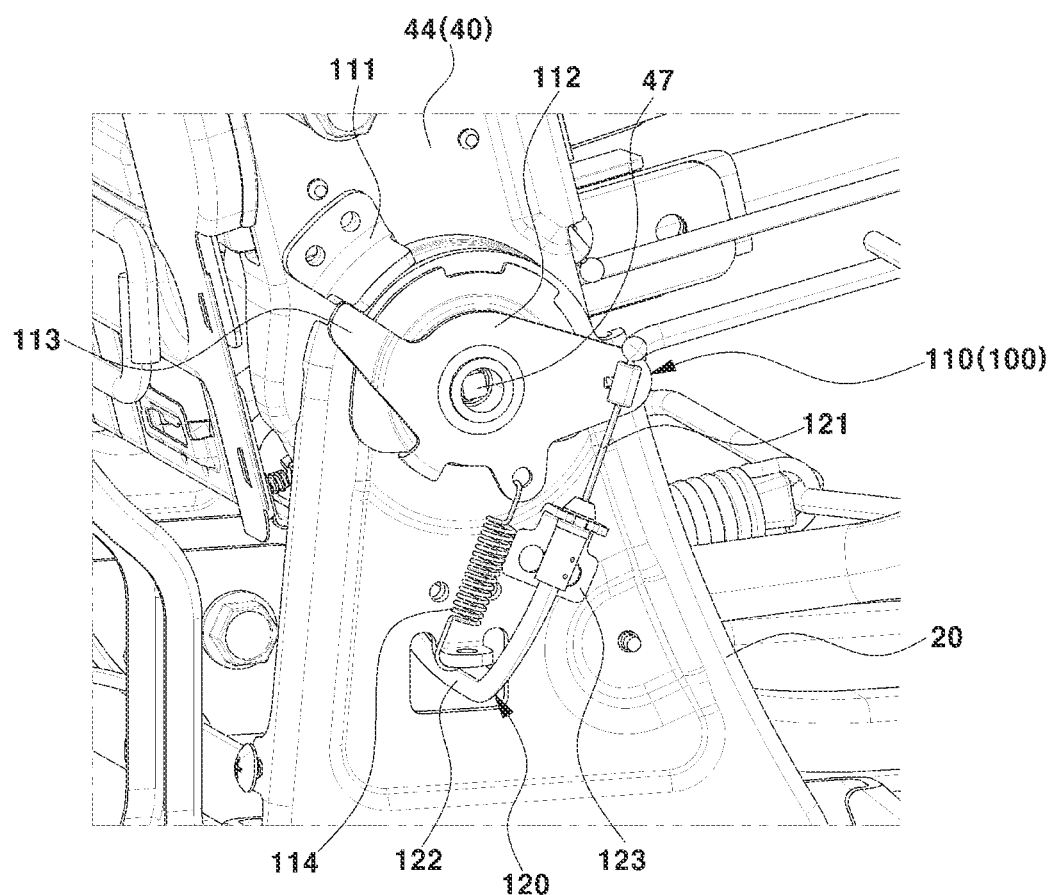
FIG. 7 is a perspective view illustrating a reclining interworking drive mechanism including a frame bracket according to an embodiment of the present invention.
Figure 8:
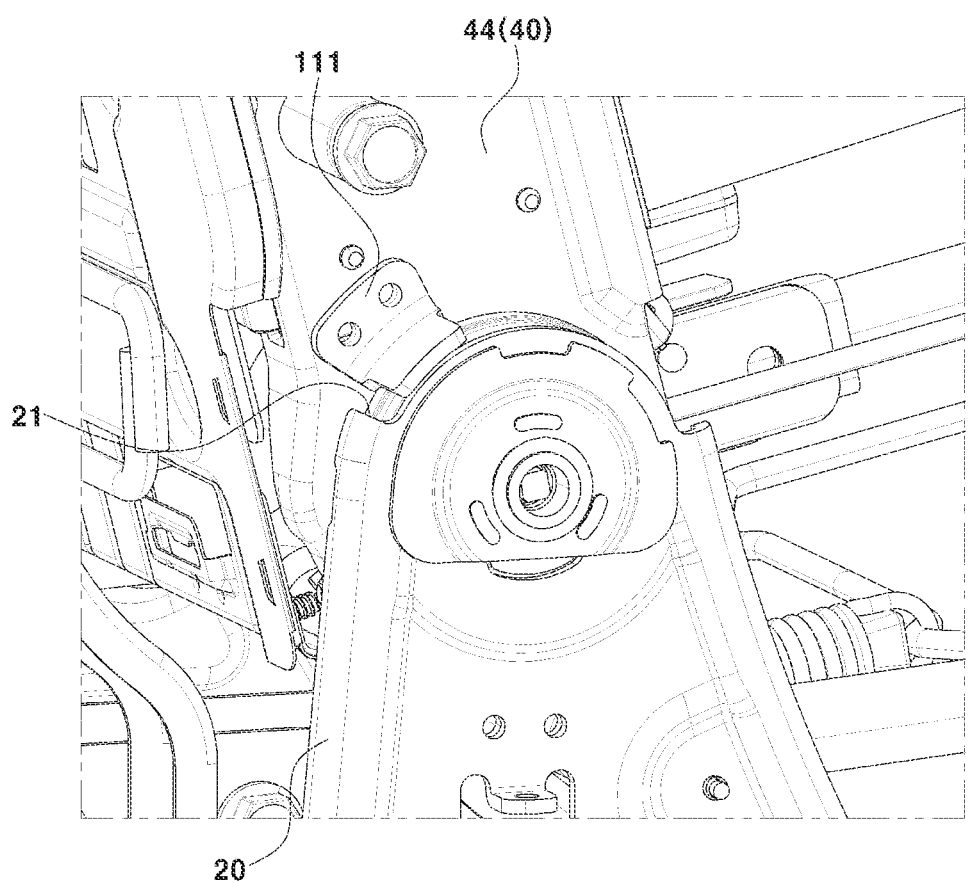
FIG. 8 is a perspective view illustrating a frame bracket and a stopper part for limiting backward reclining of the seatback in the vehicle seat according to an embodiment of the present invention.

FIG. 7 is a perspective view illustrating a reclining interworking drive mechanism 110 including a frame bracket 111 according to an embodiment of the present invention, and FIG. 8 is a perspective view illustrating the frame bracket 111 and a stopper part 21 for limiting backward reclining of the seatback in the vehicle seat according to an embodiment of the present invention.

In the configuration of the tilting device 100, the reclining interworking drive mechanism 110 is a mechanism that tilts the tilting part 1a in conjunction with the reclining operation of the seatback 1, particularly a mechanism that generates and provides the actuating force to tilt the tilting part 1a forward during the backward reclining.

In an embodiment of the present invention, when the seatback 1 performs a backward reclining operation, particularly when the lower frame 44 of the back frame 40 is pivoted backward around the hinge joint with the base bracket 20, the reclining interworking drive mechanism 110 generates an actuating force to tilt the tilting part 1*a* forward by pulling the cable 121.

In an embodiment of the present invention, the lower frame 44 of the back frame 40 is pivotably coupled to the base bracket 20 via the hinge shaft 47, so that when the seatback 1 is reclined, the lower frame 44 is pivoted with respect to the base bracket 20 about the hinge shaft 47.

The hinge shaft 47 is a shaft that pivotably hinge-couples the lower frame 44 of the back frame 40 to the base bracket 20 and is also the center of pivot of the back frame 40 during the reclining operation of the seatback 1.

In an embodiment of the present invention, the reclining interworking drive mechanism 110 includes a frame bracket 111 that is fixed to the back frame 40 of the seatback 1 so as to move along a defined trajectory along with the pivoting of the back frame 40 during the backward reclining of the seatback 1 and an interworking link bracket 112 that is mounted on the base bracket 20 so as to be pivotable around the hinge shaft 47 between the base bracket 20 and the back frame 40 so that the cable 121 is pulled by the frame bracket 111 being moved during the backward reclining of the seatback 1.

In addition, the reclining interworking drive mechanism 110 includes a return spring 114 that is mounted between the interworking link bracket 112 and the base bracket 20 to provide the elastic restoring force for restoring and pivoting the interworking link bracket 112 pivoted by the frame bracket 111 toward its original position.

The frame bracket 111 may be fixedly mounted on the outer surface of the lower frame 44 of the back frame 40, particularly around the hinge joint of the base bracket 20 in the lower frame 44.

Accordingly, when the lower frame 44 of the back frame 40 is being pivoted around the hinge shaft 47 with the base bracket 20 during the backward reclining of the seatback 1, the frame bracket 111 may move along a predetermined trajectory around the hinge shaft 47.

In addition, a protrusion 113 is formed on one side of the interworking link bracket 112. The protrusion 113 may serve to interfere with the movement of the frame bracket 111 when the lower frame 44 of the back frame 40 is pivoted during the backward reclining of the seatback 1.

Accordingly, when the lower frame 44 of the back frame 40 is pivoted during the backward reclining of the seatback 1, the frame bracket 111 moves along a predetermined trajectory and pushes the protrusion 113 so that the interworking link bracket 112 is pivoted in the direction of pulling the cable 121.

To this end, one end of the cable 121 is coupled to the other side of the interworking link bracket 112, and the other end of the cable 121 is connected to the pivot mechanism 130 for pivoting the upper frame 41. Accordingly, the pivoting force of the interworking link bracket 112 is converted into a pulling force of the cable 121, which is transmitted to the pivot mechanism 130 as an actuating force for tilting the tilting part 1*a* forward.

In addition, one end of the return spring 114 is coupled to another part of the interworking link bracket 112, and the other end of the return spring 114 is coupled to the base bracket 20.

FIG. 8 illustrates a configuration for limiting an additional backward reclining operation of the seatback 1 when the seatback 1 is reclined backward by a maximum set angle. In this regard, as is known in the art, when a strap (not shown) is pulled by the occupant's manipulation of a lever (not shown) provided on a lateral side of a lower part of the seat, the recliner 3 is unlocked.

At this time, when the occupant reclines the seatback 1 backward, the lower frame 44 of the back frame 40 is pivoted around the hinge shaft 47 with the base bracket 20 so that the seatback 1 is reclined backward.

Then, when the frame bracket 111 fixed to the lower frame 44 of the back frame 40 collides with the stopper part 21 formed on one side of the base bracket 20 and stops, the seatback 1 is no longer reclined backward.

In addition, while the seatback 1 is reclined backward, the frame bracket 111 moves backward along the predetermined trajectory until the frame bracket comes into contact with the stopper part 21. The movement of the frame bracket 111 allows the interworking link bracket 112 to be pushed and pivoted. When the interworking link bracket 112 is pivoted in this way, the cable 121 is pulled by the pivoting operation of the interworking link bracket 112.

Figure 9:
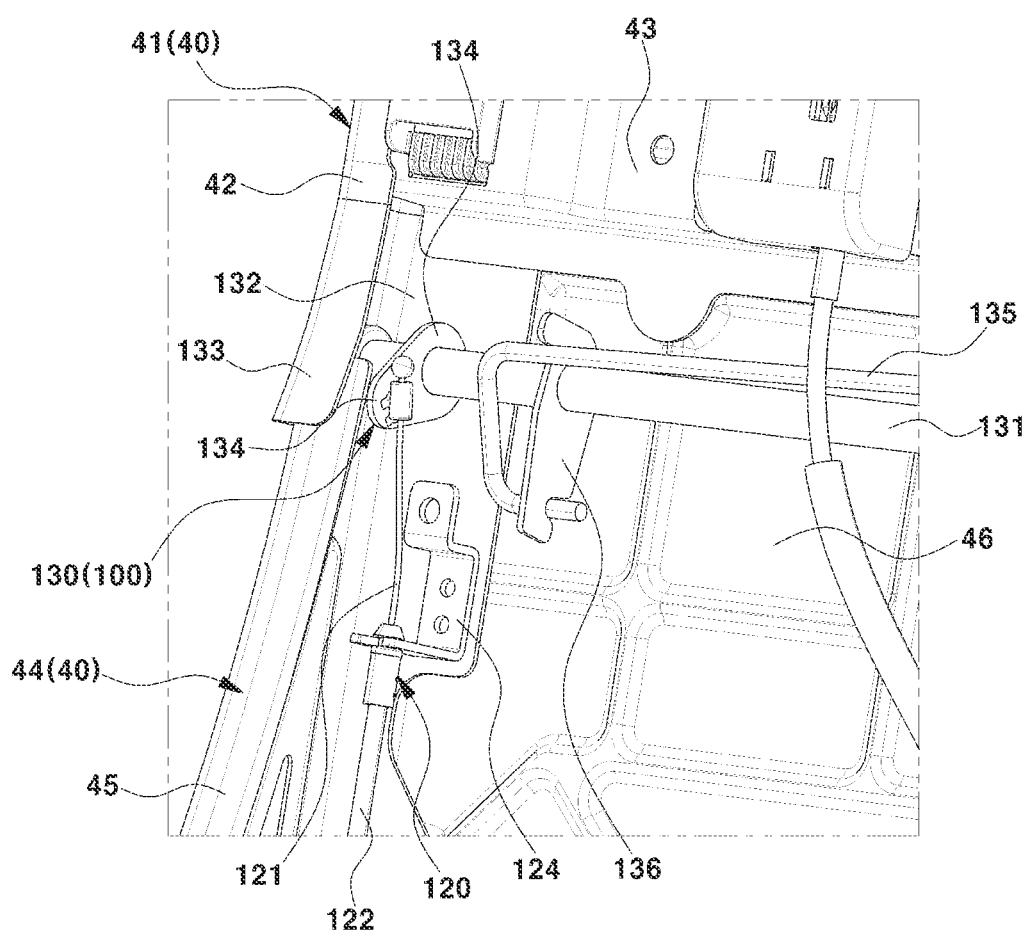
FIG. 9 is a perspective view illustrating the configuration of a pivot mechanism for tilting a tilting part in the vehicle seat according to an embodiment of the present invention.

FIG. 9 is a perspective view illustrating the configuration of the pivot mechanism 130 for tilting the tilting part in the vehicle seat according to an embodiment of the present invention. FIG. 9 is an enlarged view of part 'A' in FIG. 3. As illustrated, the cable 121 is connected to the pivot mechanism 130 for transmitting the actuating force from the reclining interworking drive mechanism 110 illustrated in FIG. 7.

In an embodiment of the present invention, the pivot mechanism 130 includes an actuating shaft 131 that is pivotably coupled to the lower frame 44 and is fixed to the lower end of the upper frame 41 to hinge-couple the upper frame 41 and the lower frame 44 and a pivot bracket 134 that is fixedly mounted on the operation shaft 131 in a manner of protruding forward to pivot the actuating shaft 131 by being pulled by the actuating force transmitted through the cable 121 from the reclining interworking drive mechanism 110 with the other end of the cable 121 connected thereto.

In addition, the pivot mechanism 130 may further include an elastic member 135 that provides an elastic restoring force for restoring and pivoting the pivot bracket 134 pivoted by the actuating force transmitted through the cable 121 toward its original position when the pulling force of the cable is released.

The actuating shaft 131 is a shaft that extends left and right to connect the upper ends of the left and right side frames of the lower frame 44, that is, the upper ends of the lower side frames 45 on both the left and right sides.

At this time, both ends of the actuating shaft 131 pass through and protrude out of the upper ends of both side frames of the lower frame 44, whereby the actuating shaft 131 is in a state of being pivotably coupled with respect to the lower frame 44.

In addition, both ends of the operation shaft 131 protruding outward through both side frames of the lower frame 44 are coupled to the upper frame 41 so as to pivot along with the upper frame 41. That is, both ends of the actuating shaft 131 are coupled to both left and right side frames of the upper frame 41, particularly the upper side frames 42 on both left and right sides so as to pivot along with the upper side frames.

In an embodiment of the present invention, both ends of the actuating shaft 131 may be coupled to the upper side frames 42 on both left and right sides via separate shaft support brackets 132 so as to pivot along with the upper side frames.

At this time, the coupling may be performed such that both ends of the actuating shaft 131 pass through the corresponding shaft support brackets 132, respectively, and in this state, both of the ends of the actuating shaft may be integrally fixed to the shaft support brackets 132.

In addition, the shaft support bracket 132 to which the end of the actuating shaft 131 is fixed is fastened to both left and right sides of the upper frame 41. In detail, the two shaft support brackets 132 fixed to both ends of the actuating shaft 131 may be integrally fastened to the left and right side frames of the upper frame 41, that is, the lower ends of the upper side frames 42 on both left and right sides, by means of a weld or the like.

In this way, as both ends of the actuating shaft 131 are integrally pivotably coupled to the upper frame 41 via the shaft support brackets 132 in a state of passing through the lower frame 44, the upper frame 41 has a configuration of being pivotably coupled to the lower frame 44 via the actuating shaft 131 so that the upper frame 41 is in a state of being pivotably supported by the lower frame 44.

In this way, as the upper frame 41 is provided to pivot forward and backward with respect to the lower frame 44 around the actuating shaft 131, the tilting part 1a can be tilted forward and backward.

In addition, each shaft support bracket 132 includes a stopper part 133 formed on one side in a structure capable of covering the upper end of the lower frame 44 from the front side. The stopper part 133 comes into contact with the upper end of the lower frame 44 when the upper frame 41 is pivoted forward a predetermined angle or more with respect to the lower frame 44.

That is, the stopper part 133 formed on each shaft support bracket 132 is provided with a structure that can cover the upper end of the lower side frame 45 from the front side even in the lower frame 44. Accordingly, when the tilting part 1a is tilted forward during the backward reclining of the seatback 1, the stopper part 133 of the shaft support bracket 132 comes into contact with the upper end of the lower side frame 45 along with the pivoting of the upper frame 41, so that the upper frame 41 cannot be further pivoted after the contact of the stopper part 133 with the upper end.

As such, since the forward pivoting of the upper frame 41 is limited by the contact between the stopper part 133 and the lower frame 44, the tilting part 1a is no longer tilted forward from a predetermined maximum tilting angle.

In addition, the elastic member 135 may be mounted between the actuating shaft 131 and the lower frame 44. Particularly, one end of the elastic member 135 is coupled to a first support bracket 136 integrally fixed to the actuating shaft 131, and the other end of the elastic member 135 is coupled to a second support bracket 137 integrally fixed to the lower frame 44.

At this time, the first support bracket 136 may be fixedly mounted on the outer circumferential surface of the right end of the actuating shaft 131 with respect to the left-right direction of the seat, and the second support bracket 137 may be fixedly mounted on the left side of the front plate face of the lower frame 44 or the left side frame (i.e., the lower hidden frame on the left side) of the lower frame 44 with respect to the left-right direction of the seat.

In addition, the elastic member 135 connected between the first support bracket 136 and the second support bracket 137 may be a torsion spring having an elongated rod shape. The torsion spring is deformed to have elasticity while the actuating shaft 131 is pivoted together with the upper frame 41 by the cable 121 so that the tilting part 1a is tilted forward and then applies an elastic restoring force to the actuating shaft 131 in the direction of the backward tilting of the upper frame 41 when the pulling and the transmission of the actuating force by the cable 121 are eliminated.

Accordingly, the upper frame 41 can be pivoted around the lower end hinged-coupled to the lower frame 44 via the actuating shaft 131, and in particular, during the pulling operation of the cable 121, the actuating force is transmitted via the actuating shaft 131 so that the upper frame 41 is pivoted forward, enabling the tilting part 1a to be tilted forward.

At this time, the actuating force transmitted through the cable 121 is generated by and transmitted from the reclining interworking drive mechanism 110 as the seatback 1 is reclined backward. An actuating force can be transmitted to the pivot mechanism 130 by pulling the cable 121, and the actuating force at this time can perform forward tilting of the tilting part 1a in conjunction with the backward reclining of the seatback 1.

Then, when the seatback 1 is reclined forward, the pulling and the transmission of the actuating force by the cable 121 are eliminated so that the actuating shaft 131 is restored and pivoted in the opposite direction by the elastic restoring force of the torsion spring, which is the elastic member 135. Accordingly, as the upper frame 41 is pivoted backward, the forward-tilted state of the tilting part 1a is restored to the backward position.

In FIG. 9, reference numeral 124 denotes a bracket fixing an end of a cable tube 122. As illustrated, a cable assembly 120 includes the cable 121 and the cable tube 122 surrounding the cable 121.

The cable 121 is assembled in a state of being encased in the cable tube 122, so that the cable 121 is supported and guided by the cable tube 122. That is, since the cable 121 is surrounded by the cable tube 122, the cable 121 can be moved and guided within the cable tube 122 when the cable is pulled.

As described above, one end of the cable 121 in the cable assembly 120 is coupled to the interworking link bracket 112 of the reclining interworking drive mechanism 110, and the other end of the cable 121 is coupled to the pivot bracket 134 of the pivot mechanism 130.

In addition, both ends of the cable tube 122 are fixedly supported by the brackets 123 and 124 disposed on a predetermined path of the cable 121. That is, one end of the cable tube 122 is fixed to the bracket 123 mounted on the base bracket 20 as illustrated in FIG. 7, and the other end of the cable tube 122 is fixed to the bracket 124 mounted on the lower frame 44 as illustrated in FIG. 9.

Figure 10:
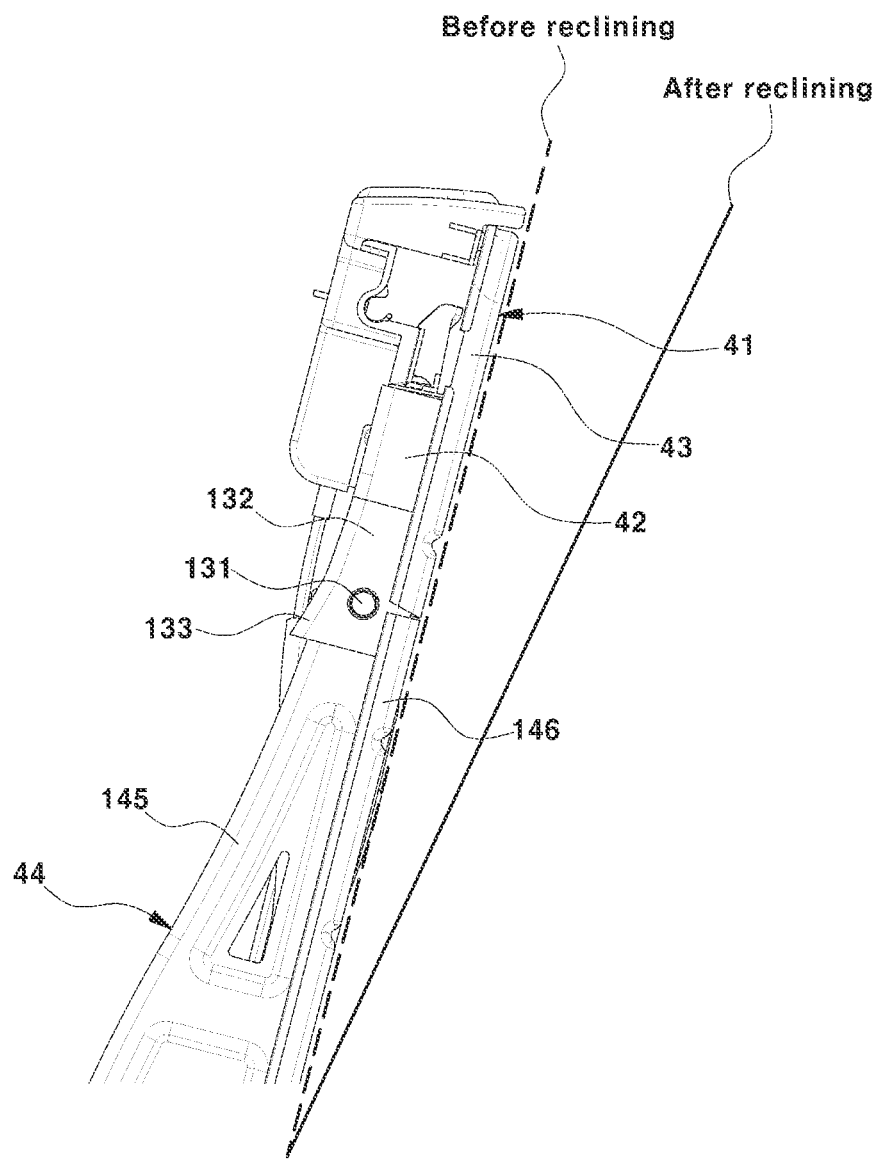
FIGS. 10 and 11 are side views illustrating states before and after seatback reclining in the vehicle seat according to an embodiment of the present invention.
Figure 11:
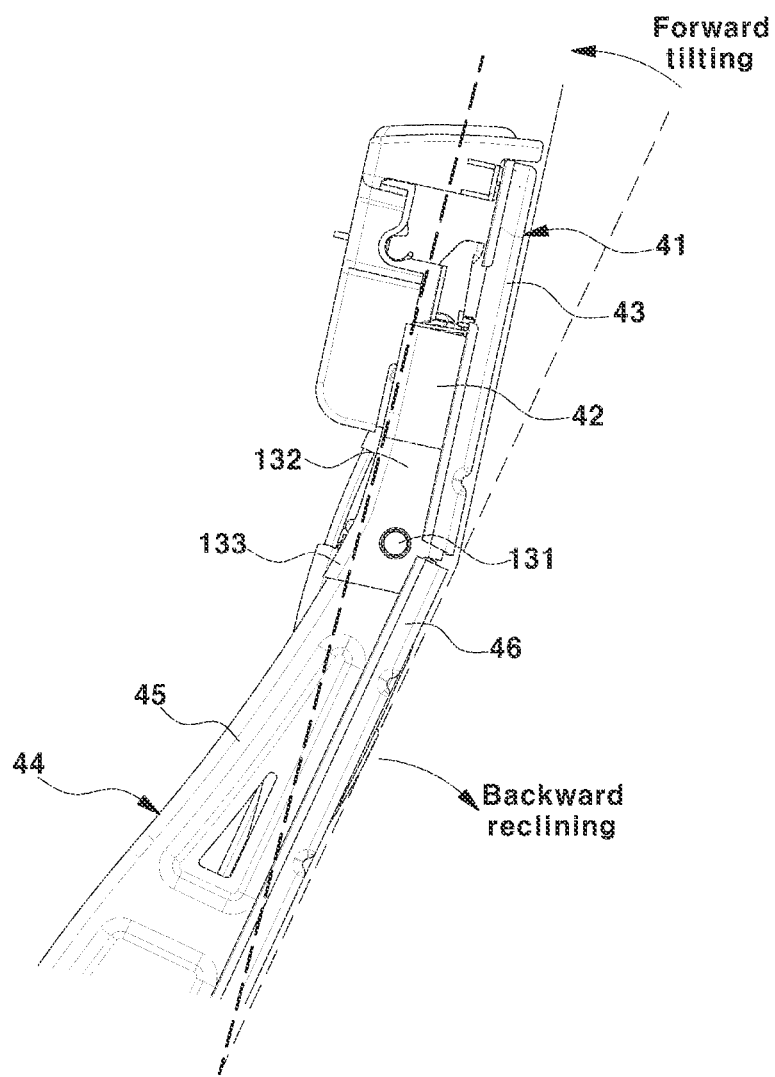

FIGS. 10 and 11 are side views illustrating states before and after seatback reclining in the vehicle seat according to an embodiment of the present invention. FIG. 10 shows a state before seatback reclining. As illustrated, in the state before reclining, the lower frame 44 is in an upright position at a forward position compared to a position after reclining.

At this time, the upper frame 41 is in a relatively backward tilted state compared to the position after reclining, and in the state before reclining, as illustrated from the side view of FIG. 10, the upper frame may be in a state of being arranged along a substantially linear line with respect to the lower frame 44.

Then, in conjunction with the backward reclining operation of the seatback 1, the tilting part 1a, which is the upper part of the seatback 1, is tilted forward. The operation of the reclining interworking drive mechanism 110, the operation of the cable 121, and the operation of the pivot mechanism 130 for providing the above forward tilting have been described in detail through the description of the configurations above.

To summarize once again, in the state of FIG. 10, when the seatback 1 is reclined backward, the lower frame 44 of the seatback 1 is pivoted backward in the base bracket 20 to allow the frame bracket 111 to push the protrusion 113 to pivot the interworking link bracket 112. At this time, the interworking link bracket 112 is pivoted while tensioning the return spring 114, so that the cable 121 is pulled by the pivoting action of the interworking link bracket 112.

When the cable 121 is pulled in this way, the pivoting force of the interworking link bracket 112 is converted into a force of pulling the cable 121, and the actuating force for pivoting the tilting part 1a forward is generated by the reclining interworking drive mechanism 110 and is transmitted from the reclining interworking drive mechanism 110 to the pivot mechanism 130 through the cable 121.

At this time, as the pivot bracket 134 is pulled by the cable 121, the actuating shaft 131 is pivoted, and as a result, the upper frame 41 is pivoted forward so that the tilting part 1a, which is the upper part of the seatback 1, is in a state of being tilted forward as illustrated in FIG. 11.

As described above, according to the vehicle seat of embodiments of the present invention, the tilting part 1a, which is the upper part of the seatback 1, is tilted forward in conjunction with the backward reclining operation of the seatback, so that the occupant's upper body can be stably supported even when the seatback is reclined a lot. In particular, the seatback's support for the occupant's upper body can be supplemented, and the seatback's comfortable and uniform support performance can be provided.

In addition, the vehicle seat according to embodiments of the present invention has advantages in terms of cost and weight by employing a simple cable-actuated mechanism configuration instead of a motorized device configuration using a motor or the like. Furthermore, the vehicle seat according to embodiments of the present invention has advantages in terms of usability and convenience, since the forward tilting operation of the upper part of the seatback is automatically performed in conjunction with the backward reclining of the seatback without a separate operation.

While exemplary embodiments of the present invention have been described in detail, the scope of the present invention is not limited thereto, and various modifications and improvements made by those skilled in the art using the basic concept of the present invention as defined in the following claims are also included in the scope of the present invention.

What is claimed is:

1. A seat comprising:
a seatback comprising an upper seatback part and a lower seatback part, wherein the upper seatback part comprises a tilting part pivotably hinged onto the lower seatback part so as to be tiltable forward and backward with respect to the lower seatback part, and wherein the seatback further comprises a back frame comprising:
a lower frame part having a lower end hinge-coupled to a base bracket so as to be pivotable forward and backward to recline the seatback, and
an upper frame part having a lower end hinge-coupled to an upper end of the lower frame part so as to be pivotable forward and backward, the upper frame part being a part of the tilting part; and
a tilting device configured to tilt the tilting part forward and backward in conjunction with a reclining operation of the seatback, wherein the tilting device is configured to tilt the tilting part forward in conjunction with a backward reclining operation of the seatback, and wherein the tilting device comprises:
a reclining interworking drive mechanism configured to provide an actuating force for forward tilting of the tilting part in conjunction with the backward reclining operation of the seatback,
a cable configured to transfer the actuating force provided by the reclining interworking drive mechanism, and
a pivot mechanism mounted between the upper frame part and the lower frame part to pivot the upper frame part forward with the actuating force transferred through the cable so that the tilting part is tilted forward.

2. The seat of claim 1, wherein the reclining interworking drive mechanism comprises:
a frame bracket fixed to the lower frame part and configured to move when the lower frame part is pivoted around a hinge joint with the base bracket; and
an interworking link bracket mounted on the base bracket so as to be pivotable around the hinge joint between the lower frame part and the base bracket and configured to be pivoted to pull the cable by the frame bracket being moved during the backward reclining operation of the seatback.

3. The seat of claim 2, wherein the reclining interworking drive mechanism further comprises a return spring mounted between the interworking link bracket and the base bracket and configured to provide an elastic restoring force for restoring and pivoting the interworking link bracket pivoted by the frame bracket.

4. The seat of claim 2, further comprising a protrusion on the interworking link bracket, wherein the protrusion is configured to be pushed by the frame bracket being moved during the backward reclining operation of the seatback to pivot the interworking link bracket in a direction in which the cable is pulled.

5. The seat of claim 1, wherein the pivot mechanism comprises:
an actuating shaft pivotably coupled to the lower frame part and fixed to the lower end of the upper frame part to hinge-couple the upper frame part and the lower frame part; and
a pivot bracket fixed to the actuating shaft with the cable connected thereto so as to be pullable and pivotable by the actuating force transferred through the cable to pivot the actuating shaft.

6. The seat of claim 5, wherein the pivot mechanism further comprises an elastic member mounted between the actuating shaft and the lower frame part, the elastic member being configured to provide an elastic restoring force for restoring and pivoting the pivot bracket pulled and pivoted by the actuating force transmitted through the cable based on a pulling operation by the cable being eliminated.

7. The seat of claim 5, wherein both ends of the actuating shaft are coupled to pass through left and right side frames of the lower frame part and are fixed to the lower end of the upper frame part via left and right shaft support brackets.

8. The seat of claim 7, wherein each of the shaft support brackets is fixed to the lower end of the upper frame part in a state in which each end of the actuating shaft is fixed to each of the shaft support brackets.

9. The seat of claim 8, wherein each of the shaft support brackets comprises a stopper part configured to come into contact with the upper end of the lower frame part to prevent further pivoting of the upper frame part based on the upper frame part being pivoted forward a first angle or more with respect to the lower frame part to prevent the tilting part from being no longer tilted forward from a first tilting angle.

10. A vehicle comprising:
a vehicle body;
a seat mounted in an interior region of the vehicle body, the seat comprising:
   a seatback configured to support an occupant's upper body, the seatback comprising:
      a lower seatback part;
      an upper seatback part comprising a tilting part pivotably hinged onto the lower seatback part so as to be tiltable forward and backward with respect to the lower seatback part as the upper seatback part is pivoted forward and backward about the lower seatback part;
      a lower frame part having a lower end hinge-coupled to a base bracket so as to be pivotable forward and backward to recline the seatback; and
      an upper frame part having a lower end hinge-coupled to an upper end of the lower frame part so as to be pivotable forward and backward, the upper frame part being a part of the tilting part; and
   a tilting device configured to tilt the tilting part forward and backward in conjunction with a reclining operation of the seatback, wherein the tilting device is configured to tilt the tilting part forward in conjunction with a backward reclining operation of the seatback, and wherein the tilting device comprises:
      a reclining interworking drive mechanism configured to provide an actuating force for forward tilting of the tilting part in conjunction with the backward reclining operation of the seatback;
      a cable configured to transfer the actuating force provided by the reclining interworking drive mechanism; and
      a pivot mechanism mounted between the upper frame part and the lower frame part to pivot the upper frame part forward with the actuating force transferred through the cable so that the tilting part is tilted forward.

11. The vehicle of claim 10, wherein the reclining interworking drive mechanism comprises:
   a frame bracket fixed to the lower frame part and configured to move when the lower frame part is pivoted around a hinge joint with the base bracket; and
   an interworking link bracket mounted on the base bracket so as to be pivotable around the hinge joint between the lower frame part and the base bracket and configured to be pivoted to pull the cable by the frame bracket being moved during the backward reclining operation of the seatback.

12. The vehicle of claim 11, wherein the reclining interworking drive mechanism further comprises a return spring mounted between the interworking link bracket and the base bracket and configured to provide an elastic restoring force for restoring and pivoting the interworking link bracket pivoted by the frame bracket.

13. The vehicle of claim 11, further comprising a protrusion on the interworking link bracket, wherein the protrusion is configured to be pushed by the frame bracket being moved during the backward reclining operation of the seatback to pivot the interworking link bracket in a direction in which the cable is pulled.

14. The vehicle of claim 10, wherein the pivot mechanism comprises:
   an actuating shaft pivotably coupled to the lower frame part and fixed to the lower end of the upper frame part to hinge-couple the upper frame part and the lower frame part; and
   a pivot bracket fixed to the actuating shaft with the cable connected thereto so as to be pullable and pivotable by the actuating force transferred through the cable to pivot the actuating shaft.

15. The vehicle of claim 14, wherein the pivot mechanism further comprises an elastic member mounted between the actuating shaft and the lower frame part, the elastic member being configured to provide an elastic restoring force for restoring and pivoting the pivot bracket pulled and pivoted by the actuating force transmitted through the cable once a pulling operation by the cable is eliminated.

16. The vehicle of claim 14, wherein both ends of the actuating shaft are coupled to pass through left and right side frames of the lower frame part and are fixed to the lower end of the upper frame part via left and right shaft support brackets.

17. The vehicle of claim 16, wherein each of the shaft support brackets is fixed to the lower end of the upper frame part in a state in which each end of the actuating shaft is fixed to each of the shaft support brackets.

18. The vehicle of claim 17, wherein each of the shaft support brackets comprises a stopper part configured to come into contact with the upper end of the lower frame part to prevent further pivoting of the upper frame part once the upper frame part is pivoted forward a predetermined angle or more with respect to the lower frame part in order to prevent the tilting part from being no longer tilted forward from a predetermined tilting angle.

19. A seat comprising:
a base bracket;
a seatback comprising:
   a lower seatback part comprising a lower frame part having a lower-frame-part lower end hinge-coupled to the base bracket, such that the lower seatback part is configured to pivot and tilt forward and backward relative to the base bracket,
   an upper seatback part comprising an upper frame part having an upper-frame-part lower end hinge-coupled to a lower-frame-part upper end of the lower frame part, such that the upper seatback part is configured to pivot and tilt forward and backward relative to the lower seatback part; and
a tilting device configured to tilt the upper seatback part forward in conjunction with a backward tilting of the lower seatback part, wherein the tilting device comprises:
   a tilting interworking drive mechanism configured to provide an actuating force for forward tilting of the upper frame part in conjunction with backward tilting of the lower frame part,
   a cable configured to transfer the actuating force provided by the tilting interworking drive mechanism, and
   a pivot mechanism mounted between the upper frame part and the lower frame part configured to pivot the upper frame part forward with the actuating force transferred through the cable so that the upper seatback part is tilted forward.

20. The seat of claim 19, wherein the tilting interworking drive mechanism comprises:
   a frame bracket fixed to the lower frame part and configured to move when the lower frame part is pivoted around a hinge joint with the base bracket, and an interworking link bracket mounted on the base bracket so as to be pivotable around the hinge joint between the lower frame part and the base bracket and configured to be pivoted to pull the cable by the frame bracket being moved during the backward tilting of the seatback; and wherein the seat further comprises:

a protrusion on the interworking link bracket, wherein the protrusion is configured to be pushed by the frame bracket being moved during the backward tilting of the seatback to pivot the interworking link bracket in a direction in which the cable is pulled;

wherein the pivot mechanism comprises:

an actuating shaft pivotably coupled to the lower frame part and fixed to the upper-frame-part lower end of the upper frame part to hinge-couple the upper frame part and the lower frame part;

a pivot bracket fixed to the actuating shaft with the cable connected thereto so as to be pullable and pivotable by the actuating force transferred through the cable to pivot the actuating shaft; and an elastic member mounted between the actuating shaft and the lower frame part, the elastic member being configured to provide an elastic restoring force for restoring and pivoting the pivot bracket pulled and pivoted by the actuating force transmitted through the cable based on a pulling operation by the cable being eliminated.

* * * * *

UNITED STATES PATENT AND TRADEMARK OFFICE
CERTIFICATE OF CORRECTION

PATENT NO. : 12,377,767 B2
APPLICATION NO. : 18/320693
DATED : August 5, 2025
INVENTOR(S) : Seo et al.

Page 1 of 1

It is certified that error appears in the above-identified patent and that said Letters Patent is hereby corrected as shown below:

In the Claims

In Column 13, in Claim 10, Line 6, delete "seat" and insert -- vehicle seat --.

In Column 13, in Claim 10, Line 7, delete "seat" and insert -- vehicle seat --.

Signed and Sealed this
Sixteenth Day of September, 2025

Coke Morgan Stewart
*Acting Director of the United States Patent and Trademark Office*